Aug. 24, 1954
R. N. BENNETT
2,687,118
FLUID MOTOR EMBODYING POWER UNIT OPERATIVELY
CONNECTED TO A CRANKSHAFT
Filed Aug. 23, 1951
4 Sheets-Sheet 1
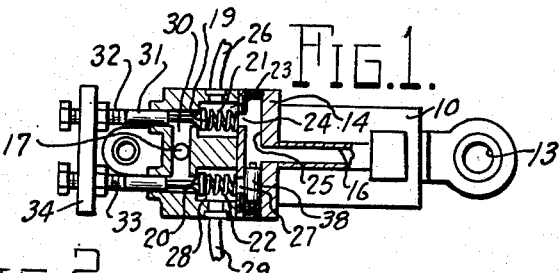
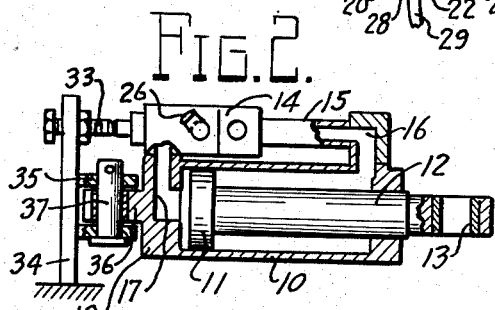
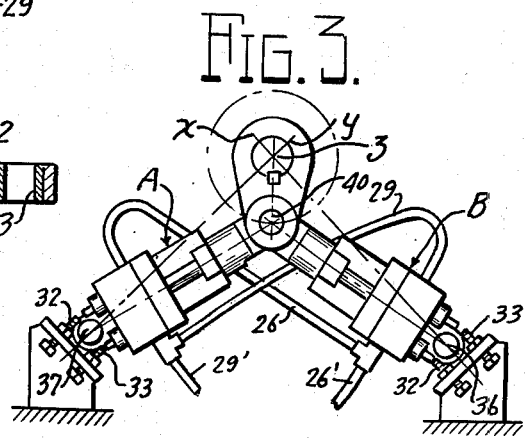
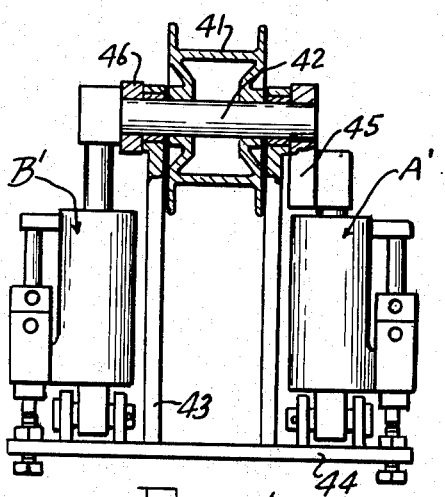
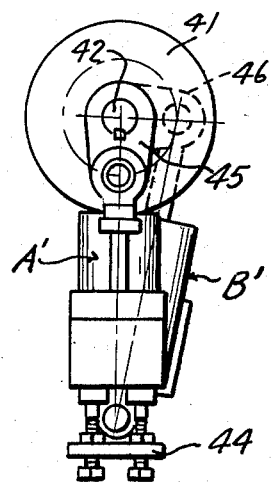
INVENTOR.
Robert N. Bennett
BY
ATTORNEY

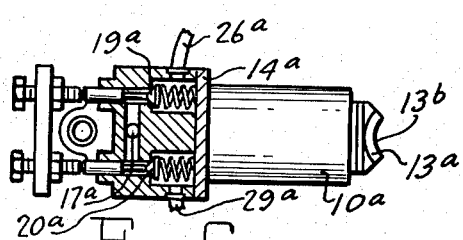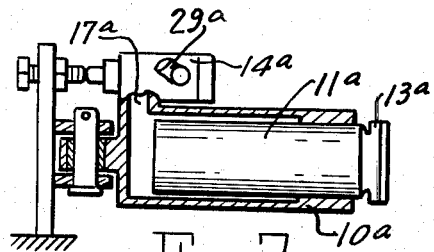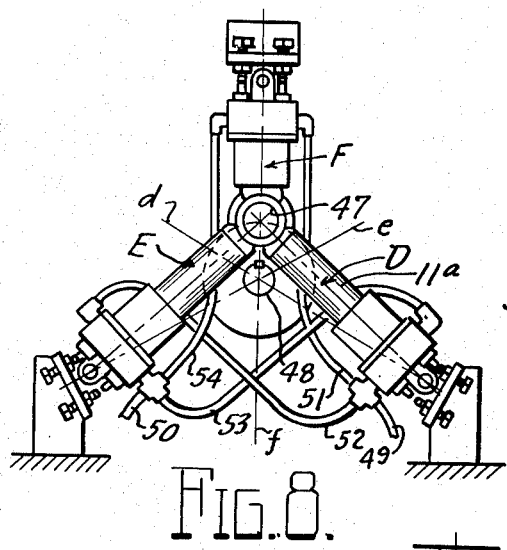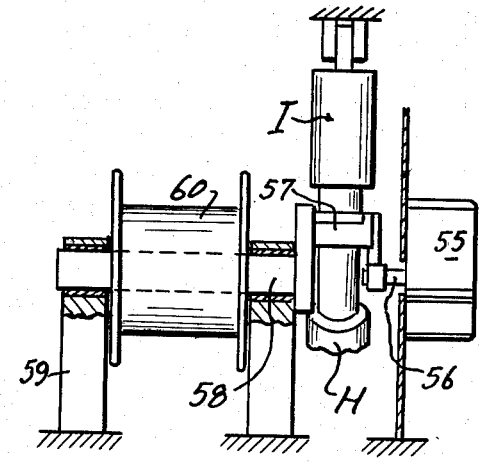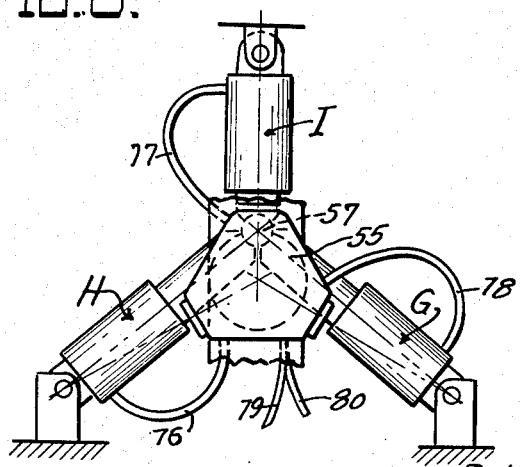

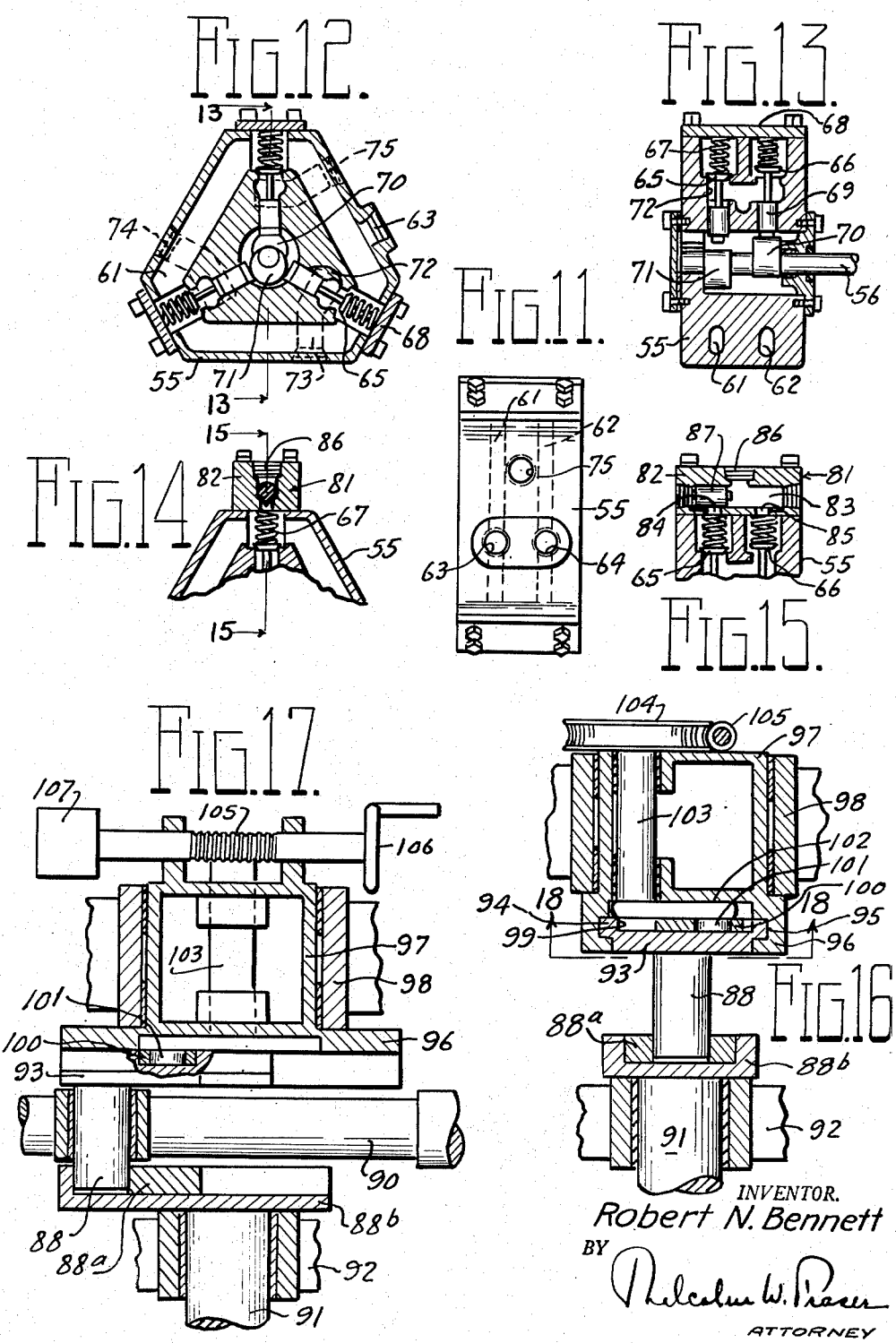

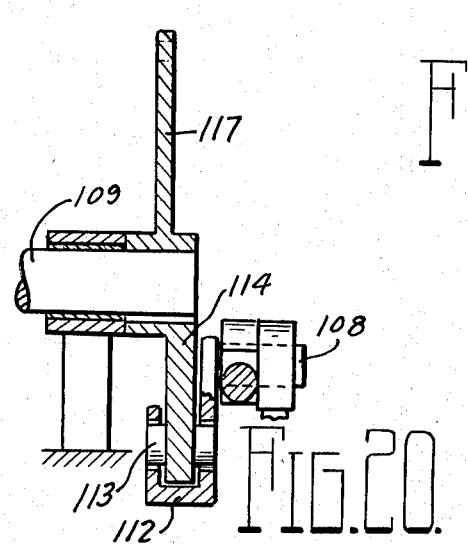
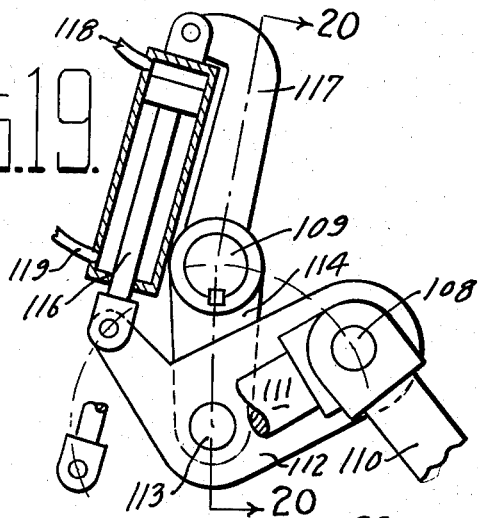
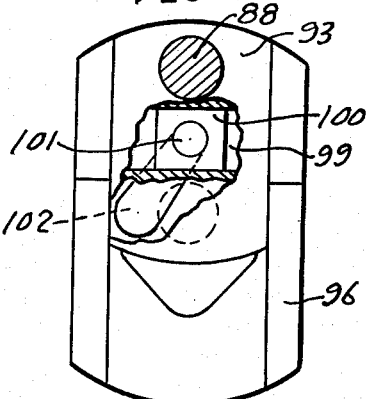
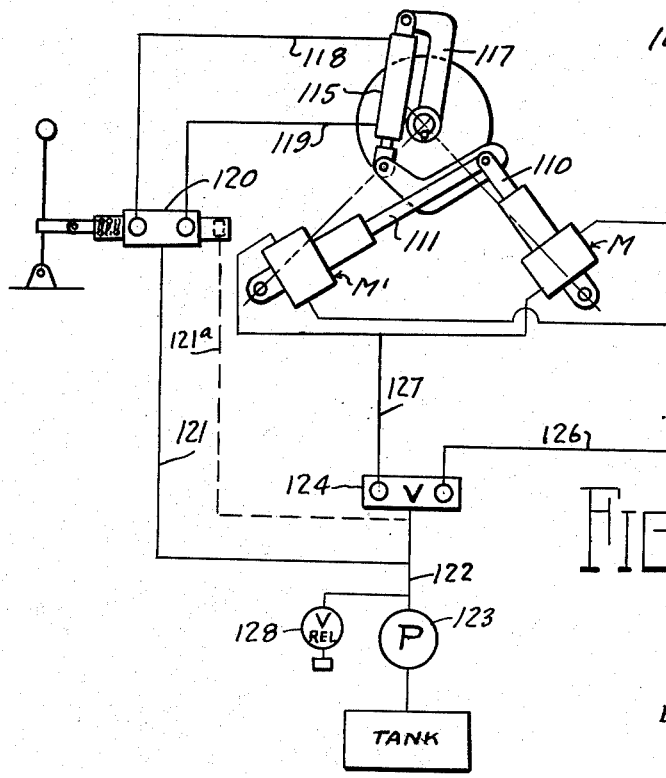

Patented Aug. 24, 1954

2,687,118

UNITED STATES PATENT OFFICE 2,687,118

FLUID MOTOR EMBODYING POWER UNITS OPERATIVELY CONNECTED TO A CRANK-SHAFT

Robert N. Bennett, McComb, Ohio

Application August 23, 1951, Serial No. 243,258

1 Claim. (Cl. 121—63)

This invention relates to slow speed, high torque, fluid type torque motors, in which the linear action of fluid actuated reciprocating pistons is translated into rotary motion in a crank shaft, and to the multiplication or conversion of the torque produced.

An object is to produce a means of transferring hydraulic power, as supplied by any suitable pumping means, to slow speed, high torque, rotary motion, and to accomplish this transfer with a minimum loss in hydraulic and mechanical efficiency and with a minimum amount of reduction between the motor and the driven mechanism.

Another object is to produce a fluid motor having means for varying the mechanical advantage between the piston and cylinder assembly and the crank shaft while in motion, to provide speed control, and/or non-slip torque converter reaction.

A further object is to produce a new and improved fluid motor in which the working parts are readily subject to repair or replacement when worn, and which may be applied directly to the slow speed driver requiring cyclic starting, stopping and speed control, such as found on heavy machinery, such as: excavating, hoisting, material handling and chemical processing machines.

Other objects and advantages of the invention will hereinafter appear, and for purposes of illustration but not of limitation, embodiments of the invention are shown in the accompanying drawings, in which:

Figure 1 is a plan view of a double action piston and cylinder assembly, with its actuating valve shown in section;

Figure 2 is a projected elevation of Figure 1, with the cylinder and certain parts shown in section;

Figure 3 is a side elevational view of two double acting piston and cylinder assemblies connected to a crank shaft;

Figure 4 is an elevation partly in section of an alternate assembly, showing two double acting piston and cylinder assemblies mounted in parallel, the driven cranks being arranged at 90° to each other on the crank shaft; and Figure 5 is an end elevation of the assembly shown in Figure 4.

The illustrated embodiment of the invention shown on Figures 1 and 2 comprises a double acting piston and cylinder assembly having a cylinder 10 in which is reciprocable a piston 11 having a piston rod 12 provided at its outer end with a crank pin engaging eye 13. The piston has equal displacement and consequently, equal force and speed in each direction of travel when actuated by a source of fluid power having constant volume and pressure. This is achieved by making the cross sectional area of the piston rod 12 approximately one-half of the cross sectional area of the inside of the cylinder 10. Thus the annular area of the rod end of the cylinder is approximately one-half of the area of the base end of the cylinder adjacent the inner end of the piston 11.

At one side of the cylinder is a valve box 14 which through a tube 15 connects to the outer end of the cylinder 10 through a passage 16. The opposite end of the valve box 14 is connected through a passage 17 leading through an enlargement 18 in the base end of the cylinder to the inner end of the cylinder. Within the valve box 14 are poppet valves 19 and 20 which are normally urged to seated position by coil springs 21 and 22 respectively. The spring 21 is disposed within a chamber 23 which communicates by a port 24 with a lateral pasage 25 which communicates intermediate its ends with the passage 16 leading to the outer end of the cylinder 10. Leading to the chamber 23 is a tube 26 which may serve either as a pressure fluid inlet conduit or a fluid discharge conduit. At the opposite end of the lateral or transverse passage 25 is a port 27 which leads to a chamber 28 in which the coil spring 22 is disposed, and leading from this passage is a tube 29 which, as will hereinafter appear, serves either as a pressure fluid inlet or discharge conduit.

The poppet valves 19 and 20 control the flow of fluid to or from the chambers 23 and 28 to a lateral or transverse passage 30 with which the passage 17 leading from the base end of the cylinder 10 connects between the valves. Connected to the outer ends of the stems of the valves 19 and 20 are cylindrical enlargements 31 which slide in bosses in the housing 14. The free ends of the cylindrical extensions 31 are engageable with adjustable stops 32 and 33 for the valves 19 and 20 respectively. The adjustable stops 32 and 33 are in the form of screws carried by a stationary post 34. Also carried by the post 34 is a pair of spaced brackets 35 between which is disposed an extension 36 rigid with the base end of the cylinder 10, a pin 37 providing a pivotal mounting for the assembly.

In operation, fluid pressure is applied continually to the rod end area of the cylinder 10 through the passage 16 and the base end of the cylinder is alternately connected to pressure or exhaust through the passage 17 through the action of the valve mechanism above described. In the extending stroke of the piston, both the rod end and base end of the cylinder are connected to pressure which results in a force on the base side of the piston 11 substantially twice that of the force on the rod side of the piston. These forces are in opposite directions, resulting in an extending force on the piston rod 12 substantially equal to the retracting force and equal to one-half of the extending force on the piston. Hence the piston 11 and rod 12 are forced outwardly of the cylinder 10 and the fluid under pressure in the rod end of the cylinder is forced through the port 16 through the passage 15 to joint with the fluid entering the valve housing through the tube or conduit 26 and thence through the passage 17 into the space at the base end of the cylinder 10. On the retracting stroke of the piston, the space in the rod end of the cylinder 10 is still connected to pressure and the space in the base end of the cylinder is connected to the exhaust through the tube or conduit 29. Consequently, the only force on the piston 11 is that subjected by pressure in the rod end of the cylinder in an inward direction, and this force is substantially equal to the resultant outward force as above described.

Inasmuch as the area of the space in the rod end of the cylinder 10 is approximately one-half the area in the base end of the cylinder, for any given stroke, the displacement of the space in the rod end is approximately one-half of the displacement in the base end of the cylinder. On the outward stroke of the piston, the volume of fluid required to fill the space at the base of the cylinder is twice the volume which is furnished from the rod end of the cylinder, leaving one-half of the space in the base end of the cylinder to be filled by fluid from an outside source, or a volume equal to that supplied from the space at the rod end of the cylinder. Thus for any given volume of fluid furnished through the tube or conduit 26, the inward and outward velocities of the piston 11 and the piston rod 12 are equal and the volume of pressure fluid flowing to the exhaust is zero during the outward stroke of the piston and twice that of the fluid from the intake conduit 26 on the inward stroke of the piston.

The strength of the springs 22 and 23 is predetermined and is such that fluid pressure in the transverse passage 17 in excess thereof opens the poppet valve connected to the exhaust or low pressure line 29 thereby allowing excess pressure fluid to flow to the low pressure line or exhaust conduit 29. As will hereinafter more fully appear, the eye 13 on the outer end of the piston rod 12 is connected to a crank pin of a crank shaft and during the revolution of the crank pin, the above described piston and cylinder assembly rocks or oscillates on the pin 37 which is carried by bracket means on the rigid supporting post 34. During such oscillating movement, the cylindrical extensions 31 of the poppet valves 19 and 20 are respectively and alternately engaged by the adjustable stops 32 and 33, thereby positively unseating one valve or the other and controlling the flow and exhaust of pressure fluid, thereby effecting uniform reciprocatory movement of the piston 11 as above described. In brief, assuming that fluid under pressure is introduced through the conduit 26 upon unseating of the poppet valve 19, liquid under pressure is introduced to the transverse passage 30 and the passage 17 leading to the base end of the cylinder 10 for driving the piston 11 outwardly of the cylinder. At the same time, however, the passage 16 is open through the transverse passage 25 and port 24 to the spring chamber 23 so that the rod end of the piston is likewise under pressure but due to the differential areas, outward actuation of the piston is effected. On the other hand, when the poppet valve 20 is unseated, the exhaust conduit 29 is open through the spring chamber 28, transverse passage 30 and passage 17 to the base end of the cylinder, enabling the liquid in the base end of the cylinder to be forced therefrom by the inward movement of the piston 11 in response to the pressure fluid in the rod end of the cylinder.

Slidable longitudinally of the transverse passage 25 is a cylindrical shuttle valve 38 which can float or slide to one end or the other of this passage for closing either the port 24 or the port 27 depending upon the position. The valve 38 is actuated by pressure either from the conduit 26 or the conduit 29, depending upon which is employed to conduct fluid under pressure. As shown in Figure 1, the conduit 26 is employed as the line for the pressure fluid so that the valve 38 is shifted and held in a position closing the port 27. Manifestly, if fluid under pressure is introduced through the conduit 29, the shuttle valve 38 is abruptly shifted to the opposite end of the passage 25 closing off the port 24. It will be understood that the control of the flow of pressure fluid through one or the other of the conduits 26 and 29 and the exhaust of fluid through the other of these conduits may be conveniently controlled in any suitable manner as by a conventional four-way valve (not shown), interposed in these conduits between the source of fluid pressure or pump (not shown) and the assembly. Such a control will enable starting, stopping or reversing of the flow of pressure fluid. It will further be apparent that in the event that the reversing action above mentioned is not required, the shuttle valve 38 may be dispensed with and in that case, the lateral passage 25 should extend only part way across the valve housing so as to connect only the passage 16 and one of the ports 24 and 27.

Figure 3 shows two piston and cylinder assemblies as shown and described in connection with Figures 1 and 2, connected to the crank pin of a crank shaft in operative position. It will be understood that although only two of these assemblies are shown, the number may be increased, the minimum number being two. It is essential that the extended center lines passing through the pivot pin 37 of each assembly and the center of rotation of the crank shaft, divide the circle about the center line of rotation of the crank shaft into substantially equal segments or arcs. It should be understood that the greater the deviation from such equality, the greater will be the deviation in the velocity of the crank shaft in the various cycles of each revolution. Such an arrangement of the piston and cylinder assemblies is shown in Figure 3 and in this instance, the conduit 26' is the high pressure line and the conduit 29' is the low pressure line communicating with a suitable tank or reservoir (not shown). From the line 26' extends a branch 26'' which extends to the assembly A and from the exhaust or low pressure line 29' extends a branch line 29'' to the assembly B. It will be observed that the extended center lines X and Y pass through the pivot pin 37 of each assembly and the center of rotation Z of a crank shaft 39 and divide the circle of rotation C of the crank pin 40 into substantially equal segments. As shown, the piston rod eyes 13 of the assemblies A and B are both connected to the crank pin 40. With this arrangement of the high and low pressure lines, the crank pin 40 will be rotated in a clockwise direction since in the positions shown, the adjustable stop 33 has unseated the poppet valve 20 of the assembly A, allowing fluid from the base end of the cylinder to flow to the low pressure line 29'. At the same time, the stop 32 has unseated the valve 19 of the assembly B. Fluid under pressure enters the base end of the cylinder of that assembly exerting an outward force against the respective piston 11. As the crank pin 40 approaches the center line Y, the poppet valve 20 of the assembly B gradually closes the passage from the chamber 28 to the lateral passage 17 and as the crank pin crosses the center line, both poppet valves of the assembly A are seated. As the crank pin 39 follows its arc of revolution still in a clockwise direction past the extended center line Y, the poppet valve 19 of the assembly A gradually opens, allowing fluid under pressure from the branch line 26'' to flow through the lateral passage 17 to the base end of the cylinder 10, thereby effecting outward movement of the piston 11 of the assembly A.

It will thus be apparent that as each of the assemblies A and B crosses the respective extended center lines, the direction of thrust and stroke of the respective piston is reversed. If the direction of flow of the pressure fluid through the lines 26' and 29' is reversed as by the operation of a conventional four-way control valve (not shown), the direction of thrust of the pistons of the two assemblies is reversed and in this manner, the direction of rotation of the crank shaft 39 can be conveniently reversed.

In the form shown in Figures 4 and 5, a cable drum 41 is mounted on a shaft 42 carried by spaced stanchions 43 fixed at their lower ends to a horizontal base plate 44. At opposite ends of the shaft 42 are crank arms 45 and 46 offset from each other at 90°. Connected to the crank pin on the crank arm 45 is a piston and cylinder assembly A' and connected to the crank pin on the crank arm 46 is a similar piston and cylinder assembly B', the lower ends of these assemblies being pivoted to the stationary base plate 44 carrying the adjustable stops for valve actuation, as above described. It will also be apparent in Figure 5 that the extended center lines of the crank arms similarly divide the circle about the center line of rotation of the crank shaft into substantially equal segments.

As compared with similar motors in use, the above motor is decidedly an improvement because of the reduction in speed pulsations because of the use of piston and cylinder assemblies in which the pistons have equal speed in each direction of stroke, as well as the use of positively operated poppet type valves. The above described motor operates efficiently at slow speeds which is exceedingly important in many installations, such as in excavating machines, cranes, oil field machinery, etc. As above indicated, the motor can operate satisfactorily at a slow speed, non-slip torque converter by using a variable length crank arm, the length of which is controlled by pressure fluid, so that as the applied load increases, the crank arm lengthens, the torque increases, the speed decreases and the pressure and horsepower input remain constant. For winch operations where it is desired that the load be dropped rapidly, the crank pin is selectively moved toward the center of rotation of the crank shaft, thereby enabling substantially free rotation of the crank shaft.

It is to be understood that numerous changes in details of construction, arrangement and operation may be effected without departing from the spirit of the invention especially as defined in the appended claim.

What I claim is:

A hydraulic motor for driving a crank shaft, having a pair of piston and cylinder assemblies connected respectively at opposite ends to the crank pin and a stationary bearing means and having such assemblies so arranged that straight lines connecting the stationary bearing means and the center of rotation of the crank shaft divide the circle of the crank pin means into substantially equal arcs, the improvement in which each piston and cylinder assembly comprises a piston, a piston rod connected to one side of said piston, a cylinder in which said piston is reciprocable and through one end of which the piston rod extends, the annular area of the rod end of the cylinder being approximately one-half the area of the base end of the cylinder adjacent the inner end of the piston, a valve chest having an inlet for pressure fluid and an exhaust, ports and passages establishing communication between said chest and the end of the cylinder through which the piston rod extends affording liquid pressure constantly on the side of the piston connected to the piston rod, ports and passages establishing communication between said valve chest and the opposite end of the cylinder, a valve means in said chest for controlling the admission of liquid to said opposite end of the cylinder, valve means for controlling the flow of liquid from said opposite cylinder end to said exhaust, the passages between the rod end and opposite end of the cylinder being in communication with each other and with the pressure fluid inlet of the valve chest on the extending stroke of the piston, and means for actuating said valves in timed relation to the rotation of the crank shaft, whereby liquid pressure is maintained on both sides of the piston head during the extending stroke of the piston and only on the rod side of the piston during the retracting stroke of the piston.

References Cited in the file of this patent

UNITED STATES PATENTS

| Number | Name | Date |
| --- | --- | --- |
| 639,738 | Kimman | Dec. 26, 1899 |
| 1,160,938 | Mitchell et al. | Nov. 16, 1915 |
| 1,584,937 | Herman | May 18, 1926 |
| 2,209,012 | Markeij | July 23, 1940 |
| 2,237,934 | Hlasney | Apr. 8, 1941 |
| 2,240,163 | Pick | Apr. 29, 1941 |
| 2,277,573 | Wichorek | Mar. 24, 1942 |
| 2,477,710 | Worstell | Aug. 2, 1949 |